Sept. 24, 1963 P. V. BLANKENSHIP ETAL 3,104,579
VARIABLE DIE FOR STRAND CUTTING MACHINE
Filed Dec. 7, 1960 2 Sheets-Sheet 1
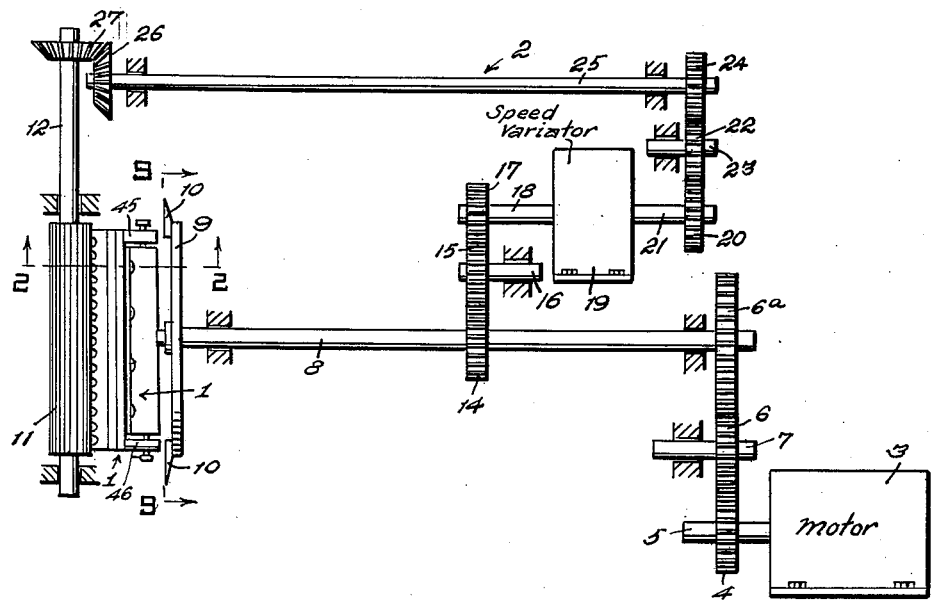
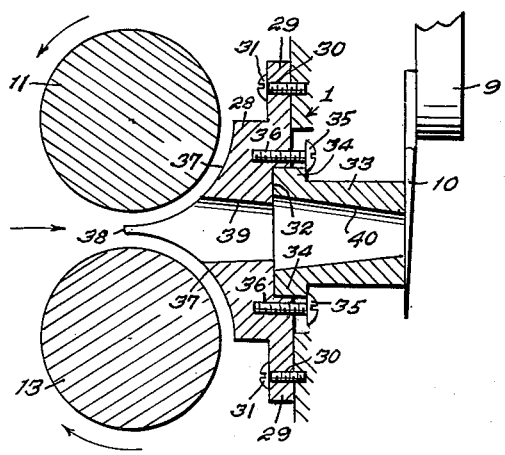
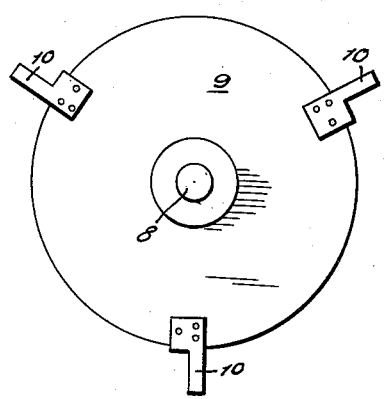
INVENTORS,
P. V. Blankenship
BY R. J. Pierce
S. J. Rotondi & A. J. Dupont

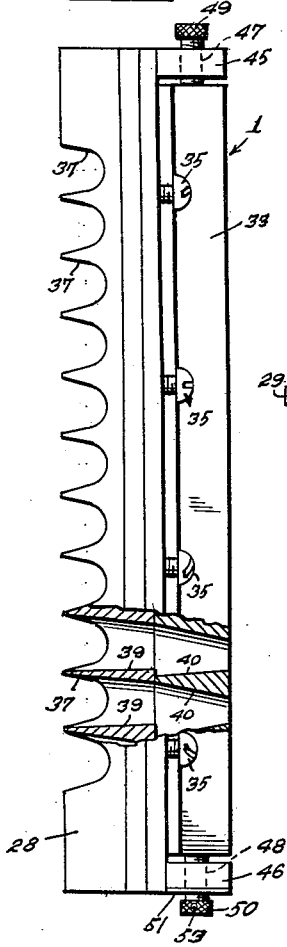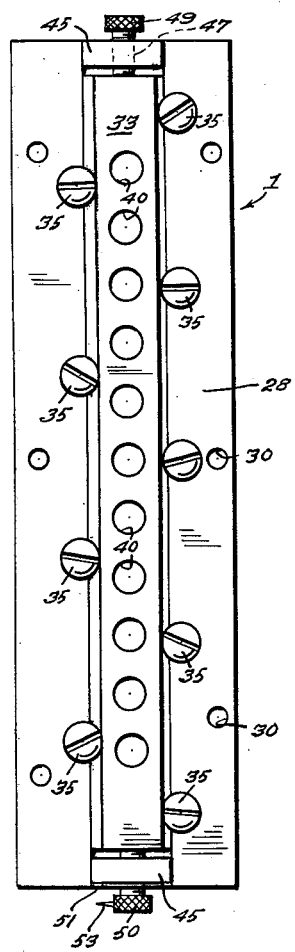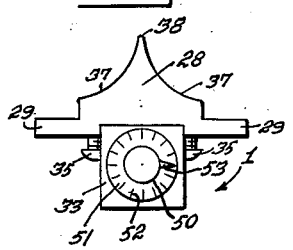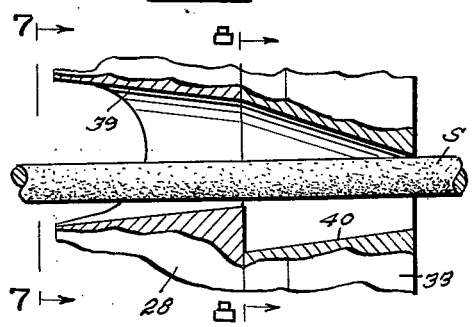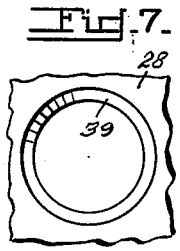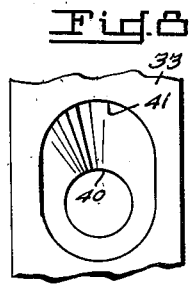

United States Patent Office 3,104,579
Patented Sept. 24, 1963

3,104,579
VARIABLE DIE FOR STRAND CUTTING
MACHINE
Paul Vernon Blankenship and Robert Jesse Pierce, Radford, Va., assignors, by mesne assignments, to the United States of America as represented by the Secretary of the Army
Filed Dec. 7, 1960, Ser. No. 74,440
4 Claims. (Cl. 83—355)

This invention relates to a variable die for powder strand cutting machines, and more particularly to a sliding die which presents the powder strand to a cutting blade at the desired angle to compensate for the angular cut produced by cutting a moving strand.

The principal difficulty encountered in previous cutting operations wherein the powder strand is fed at right angles to the cutting blade was that an angular or beveled cut was made. This was due to the travel of the strand while the actual cut was taking place.

Many attempts have been made to correct the aforesaid drawback and one method which improved the cut was to provide a wedge-shaped die having an angle equal and opposite to the angle desired to be eliminated.

While this method produced a cut that was nearer being square than before, it was impractical the objection being that the die could not be adjusted for strands of different diameters without the fabrication of other dies to fit these strands and therefore presenting a stockpiling problem and also considerable expenditure of time and money as each new diameter or granulation length of the strand required a different size die.

The present invention is designed to eliminate the disadvantages of the aforementioned method by use of an improved die consisting of the combination of a cutting die to be positioned, at will, in front of a feed die. The dies are slidable with relation to one another and are set in the predetermined position by set screws and then locked in position. Each die is provided with horizontally aligned holes. By shifting the dies, the holes are adjusted to present the powder strand to the cutting blade at the desired compensating angle to result in an approximately square cut.

Each hole in the cutting die is taper-bored to 102% of the powder strand diameter on the front of the die, and to 108% of the strand at the rear of the die. This hole is then elongated along the horizontal plane on one side of its longitudinal axis from the rear side of the tapered hole to a major diameter of 120% of the strand diameter without changing the dimension of the hole.

The feed die holes are also taper-bored from 108% of the powder strand diameter on the front side to 110% of the strand diameter on the rear side.

These holes then permit the strand to shift between the dies without binding when the cutting die is shifted to adjust the angle of cut.

It is therefore a primary object of this invention to provide a die in which a powder strand is presented to a cutter blade at the proper angle to compensate for the angle or cut produced by a strand moving at right angle to the cutter.

It is another object to provide a cutting die arranged in slidable relation to a feed die.

A further object is to provide means for holding the cutting die in a pre-selected position relative to the feed die.

Still another object is to provide a series of aligned tapered holes in the cutting and feed dies.

A final object is to provide an adjustable die that will compensate for the cutting angle of a strand of powder to eliminate the necessity of fabricating a separate die for each change of diameter or length of cut of the strand.

The specific nature of the invention as well as other objects and advantages thereof, will clearly appear from a description of a preferred embodiment as shown in the accompanying drawings in which:

FIG. 1 is a top plan view showing the die of the invention in assembled relation and its position with respect to the drive mechanism and to the cutter;

FIG. 2 is a vertical cross section taken along line 2—2 of FIG. 1;

FIG. 3 is an enlarged top plan view of the die assembly, separated from the drive mechanism and partly broken away to show the guide holes in the cutting and feeding dies;

FIG. 4 is a bottom view of the die assembly;

FIG. 5 is an end view of the die assembly;

FIG. 6 is an enlarged detail section of the guide holes in the cutting and feed dies and a powder strand in position for cutting and taken along a horizontal plane;

FIG. 7 is a fragmentary end view of one of the tapered holes of the feed die, looking in the direction of the plane indicated by line 7—7 of FIG. 6;

FIG. 8 is a fragmentary end view of one of the tapered holes of the cutting die, looking in the direction of the plane indicated by line 8—8 of FIG. 6; and, FIG. 9 is an end view of the cutter, looking in the direction of the plane indicated by line 9—9 of FIG. 1.

Referring to the drawing, 1 indicated the die assembly of the invention generally. As shown in FIG. 1, die assembly 1 is in its operating position in a driving mechanism for feeding strands of powder into it for cutting and for rotating a cutting element.

The drive mechanism is indicated generally, as at 2 and consists of a motor 3 having a gear 4 mounted on a drive shaft 5. Gear 4 meshes with an idler gear 6 on stub shaft 7 and idler gear 6 meshes with a gear 6a mounted on one end of a shaft 8 which carries a disc 9 at its other end, the disc 9 having blades 10 fixed thereto.

A feed roller 11 carried by a shaft 12 is disposed in front of die assembly 1 as seen in FIGS. 1 and 2. An idler roller 13 (see FIG. 2) is disposed in vertical spaced alignment below roller 11.

A drive for rotating feed roller 11 is provided and consists of a gear 14 on shaft 8 which meshes with an idler gear 15 on a stub shaft 16. Idler gear 15, in turn, meshes with a gear 17 on shaft 18 which is connected to a speed variator 19. A gear 20 is mounted on take off shaft 21 from speed variator 19 and meshes within idler gear 22 on a stub shaft 23. Gear 22 meshes with a gear 24 on shaft 25 and a beveled gear 26 on shaft 25 meshes with a beveled gear 27 on shaft 12, thus completing the drive mechanism.

Die assembly 1 is best illustrated in FIGS. 1 to 8 and consists of a feed die 28 which is positioned as seen in FIG. 2, whereby its horizontal axis is disposed medially between rollers 11 and 13. Feed die 28 is provided with flanges 29 which are bored as at 30 to receive screws 31 for fastening to a framework (not shown) of a cutting machine, also not shown.

A longitudinal groove 32 is provided on one side of die 28 to slidably receive a variable position cutting die 33. Die 33 is also provided with flanges 34. Screws 35 are provided for retaining die 33 in position in groove 32, and are screwed into threaded bores 36 in die 28 so that their heads will be adjacent flanges 34 and act as retaining and guiding means.

Feed die 28 is provided with symmetrical curved cut outs 37 to provide a series of aligned tongues 38 to fit close to rollers 11 and 13. The feed die is further provided with spaced, horizontally aligned tapered holes 39 for receiving a strand S (see FIG. 6). Holes 39 taper outwardly towards rollers 11 and 13.

Cutting die 33 is provided with tapered holes 40, also tapering outwardly towards rollers 11 and 13 and also disposed in spaced horizontal alignment in die 33 and are for the purpose of presenting the strand S to cutters 10 at the desired angle to insure a square cut.

As seen in FIGS. 6 and 8, each hole 40 of the cutting die 33 is elongated from the rear side of the tapered hole as at 41 to 102% of the diameter of strand S, for the purpose of preventing binding of the strands between the holes in dies 28 and 33.

As seen in FIGS. 1, 3 and 4, die 33 is of a shorter extent than die 28. This is for the purpose of providing means to adjust the slidable position of die 33 relative to die 28. Die 28 is provided with a pair of forwardly extending arms 45 and 46. Each arm is provided with a threaded bore 47 and 48 to receive set screws 49 and 50, respectively.

Means are provided for visual indication of the setting of the dies 28 and 33 and consists of a dial 51 having indicia 52. Dial 51 is positioned on the outer end of arm 46. A pointer 53 is fixed on set screw 50. (See FIG. 5.)

The operation of the die assembly is simple.

The dies are adjusted to their proper setting for presenting the strand S at the proper angle to the cutters 10 by unscrewing set screw 49, then by turning set screw 50 until the pointer 53 registers with the proper point on dial 51, the set screw 49 is tightened and the die assembly is ready for feeding strands to the cutter 9.

For varying the length of granulation of strand S, speed variator 19 is employed in the drive, and may be of any well known type in which speed of various drives are regulated.

Variations and modifications may be effected without departing from the scope of the novel concept of the present invention.

What is claimed is:

1. A variable strand cutting machine including a driving mechanism; a feed roller driven by said driving mechanism; an idler roller arranged in vertical spaced parallel relation to said feed roller; and a cutter member driven by said driving mechanism, said cutter member being spaced from said feed and idler roller; a die assembly disposed between said feed and idler rollers and said cutter member, said die assembly comprising a feed die and a cutter die, said feed die having a series of horizontally aligned equally spaced bores, said bores in said feed die tapering outwardly towards said feed and idler rollers, there being a series of integral curved horizontally aligned tongues on said feed die, said tongues lying closely between said feed and idler rollers, and said cutter die slidably engages said feed die, said cutter die having a series of horizontally aligned equally spaced bores, said last named bores tapering outwardly towards said feed and idler rollers; and adjustable means carried by said feed die for regulating the longitudinal axes of said bores in said feed die with respect to the longitudinal axes of said bores in said cutter die whereby a strand being continuously fed to said cutter member through said bores in said feed and cutter dies is positioned at a predetermined angle to compensate for its speed of travel in order that said cutter member will effect a square cut through said strand.

2. A variable strand cutting machine as set forth in claim 1 wherein the adjusting means for regulating the position of the cutting die relative to the feed die comprises a horizontally extending arm integral on each end of the feed die and a set screw threadable in each said arm and arranged in axial relation, said set screws adapted to engage the ends of said second die.

3. A variable strand cutting machine as claimed in claim 1 wherein the bores in said feed and cutting dies taper in the same direction, the bores in said cutting die being elongated from their rear sides toward their front sides in a horizontal plane.

4. A variable strand cutting machine die as claimed in claim 1, including indicating means for determining the slidable position of said cutting die relative to said feed die, said means comprising an indicia bearing dial fixed to one end of said feed die and a pointer fixed for rotation with one of said set screws in one of arms and adapted to register with said indicia on said dial.

References Cited in the file of this patent

UNITED STATES PATENTS

| | | |
|---|---|---|
| 939,895 | Dobbs | Nov. 9, 1909 |
| 2,363,097 | Sutter | Nov. 21, 1944 |

FOREIGN PATENTS

| | | |
|---|---|---|
| 144,379 | Austria | Jan. 25, 1936 |